(12) United States Patent
Koo et al.

(10) Patent No.: US 7,215,884 B2
(45) Date of Patent: May 8, 2007

(54) OPTICAL DEMULTIPLEXER HAVING BRAGG DIFFRATION GRATING AND OPTICAL COMMUNICATION MODULE USING THE OPTICAL DEMULTIPLEXER

(75) Inventors: Jun-Mo Koo, Suwon-shi (KR); Se-Yoon Kim, Anyang-shi (KR); Kyoung-Youm Kim, Anyang-shi (KR)

(73) Assignee: Samsung Electronics Co., Ltd., Suwon-si, Gyeonggi-Do (KR)

( * ) Notice: Subject to any disclaimer, the term of this patent is extended or adjusted under 35 U.S.C. 154(b) by 356 days.

(21) Appl. No.: 10/744,338

(22) Filed: Dec. 23, 2003

(65) Prior Publication Data

US 2004/0264975 A1 Dec. 30, 2004

(30) Foreign Application Priority Data

Jun. 24, 2003 (KR) .................... 10-2003-0041193

(51) Int. Cl.
*H04J 14/02* (2006.01)
*H04B 10/12* (2006.01)
*G02B 6/42* (2006.01)
*G02B 6/34* (2006.01)

(52) U.S. Cl. .................... 398/82; 398/87; 398/142; 398/143; 385/31; 385/37; 385/28

(58) Field of Classification Search ................ 398/82, 398/84, 87, 142–145; 385/28, 29, 31, 37, 385/41, 42

See application file for complete search history.

(56) References Cited

U.S. PATENT DOCUMENTS 5,457,760 A * 10/1995 Mizrahi ................. 385/37

6,061,481 A * 5/2000 Heidrich et al. ............. 385/14
6,640,024 B1 * 10/2003 Kim et al. ................... 385/24

FOREIGN PATENT DOCUMENTS

| JP | 02-055301 | 2/1990 |
|---|---|---|
| JP | 05-079905 | 3/1993 |
| JP | 05-091049 | 4/1993 |
| JP | 2001-044546 | 2/2001 |
| JP | 2003-139976 | 5/2003 |
| WO | WO 00/50943 | 8/2000 |

* cited by examiner

*Primary Examiner*—Dalzid Singh
(74) *Attorney, Agent, or Firm*—Cha & Reiter, L.L.C.

(57) ABSTRACT

An optical demultiplexer having at least one Bragg diffraction grating for minimizing crosstalk on the sides of transmitting and receiving optical signals, as well as an optical communication module using the optical demultiplexer. The optical demultiplexer has first and second waveguides arranged adjacent each other in a predetermined section in order to perform mode coupling, so that the optical signals input through one end of the first waveguide are transmitted to a light receiving element through the second waveguide, and in which output light waves inputted through the other end of the first waveguide are output through the one end of the first waveguide. A first Bragg diffraction grating is formed on the second waveguide and haa wavelength selectivity, for minimizing crosstalk by transmitting a reception wavelength of the optical signals at about 100% and by reflecting a wavelength of the output light waves at about 100%.

12 Claims, 14 Drawing Sheets

(a)

(b)

(a)

(b)

OPTICAL DEMULTIPLEXER HAVING BRAGG DIFFRATION GRATING AND OPTICAL COMMUNICATION MODULE USING THE OPTICAL DEMULTIPLEXER

CLAIM OF PRIORITY

This application claims priority to an application entitled "Optical Demultiplexer Having Bragg Diffraction Grating and Optical Communication Module Using the Optical Demultiplexer" filed in the Korean Intellectual Property Office on Jun. 24, 2003 and assigned Serial No. 2003-41193, the contents of which are hereby incorporated by reference.

BACKGROUND OF THE INVENTION

1. Field of the Invention

The present invention relates to an optical communication module. More particularly, the present invention relates to an optical demultiplexer having at least one Bragg diffraction grating for minimizing crosstalk on the sides of transmitting and receiving optical signals, as well as an optical communication module using the optical demultiplexer.

2. Description of the Related Art

Recently, there has been increased demand for a bi-directional optical communication module, in which two or more optical signals of different wavelengths are allowed to travel in either direction through a single optical fiber, so that they can be transmitted or received.

FIG. 1 illustrates a principle of wavelength multiplexing during bi-directional optical communication using light of different wavelengths.

Referring to FIG. 1, one base station 1 is connected with one subscriber unit 2 through one optical fiber 3. So as not to obscure the drawing with needless detail, only one subscriber unit 2 although typically there would be many such units. Thus, in an actual bi-directional optical communication unit there are many branching points, from which each optical fiber extends to reach each subscriber unit. The base station 1 drives a light emitting element, i.e., a laser diode LD1 (4) by converting information, such as a telephone signal, a television signal, etc. into a digital signal. This digital signal, identified as having a wavelength of λ1, is transmitted through a demultiplexer 5 of the base station to the optical fiber 3, and then is received through a demultiplexer 6 of the subscriber unit into a light receiving element, i.e., a photo diode PD2 (7). Subsequently, the received optical signal is converted into an electrical signal again, and then is regenerated into an Internet text or a moving picture. In this manner, a direction traveling from the base station 1 toward the subscriber unit 2 is called a "downstream" direction.

Meanwhile, on the side of the subscriber unit 2, a data information signal is converted into an optical signal having a wavelength identified as λ2 by a laser diode 8. Light of λ2 is inputted into a photo diode PD1 (9) through the demultiplexer 6, the optical fiber 3 and the demultiplexer 5 of the base station in that order. The base station 1 appropriately processes an electrical signal, which is converted by the photo diode PD1. In this manner, a direction from the subscriber unit 2 toward the base station 1 is called an "upstream" direction.

Moreover, in order to transmit optical signals having two or more wavelengths through a single optical fiber, both the base station and the subscriber unit require a function for recognizing the wavelengths and separating light paths. It is the demultiplexer that carries out this function.

A method of manufacturing a demultiplexer is exemplified by one using an optical fiber and one using an optical thin film waveguide. With regard to the use of an optical thin film waveguide, recent trends are that the waveguide is sought to have a compact size, be low in price and have a high degree of integration. An example of a demultiplexer using an optical thin film waveguide is exemplified by a wavelength division multiplexing (WDM) filter, a multi-mode interferometer (MMI), or a directional coupler.

FIG. 2 shows a structure of an optical communication module according to the prior art, in which a demultiplexer using a wavelength division multiplexing filter is applied to the optical communication module. The demultiplexer is designed so that a multi-layer thin film 21 is inserted into a substrate 22, so that light entering from an optical fiber 23 and light exiting from a light source 24 are separated from each other according to a wavelength difference between them.

In FIG. 2, an optical signal having a particular wavelength of λ1 enters through the optical fiber 23, and then is propagated through a first waveguide to reach the multi-layer thin film 21 on the side away from the optical fiber. Since the multi-layer thin film 21 functions to reflect a particular wavelength of λ2, when light incidented from the optical fiber 23 has a transmission wavelength of λ1, not a reflection wavelength of λ2, the incident light transmits the multi-layer thin film 21 to reach an optical detector 25, for example, a photo diode that detects the incidented light. On the other hand, when light incidented from the optical fiber 23 has the reflection wavelength of λ2, for example, emitted from a laser diode, the incident light is then incidented into and propagated to a second waveguide, and then reflected by the multi-layer thin film 21 to exit through the optical fiber 23.

However, the prior art entails practical difficulties in actual application, because a process for inserting a multi-layer thin film into a substrate is very complicated, and such construction requires a highly sophisticated manufacturing method.

FIGS. 3 and 4 show constructions of a demultiplexer using an optical thin film waveguide in accordance with the prior art. Specifically, FIG. 3 shows a construction of a demultiplexer using a multi-mode interferometer (MMI). FIGS. 4 and 5 show constructions of a demultiplexer using a directional coupler (DC). More particularly, FIG. 4 shows a construction of a biplexer using two different wavelengths, and FIG. 5 shows a construction of a triplexer using three different wavelengths.

However, in the case of the demultiplexer using the conventional MMI shown in FIG. 3, crosstalk and insertion loss are changed depending on both a width W and a length L in a waveguide, as shown in FIGS. 6 and 7. FIGS. 6a and 6b show a change of the insertion loss O and the crosstalk P at wavelengths of 1550 nm and 1310 nm, respectively, according to a width W of a waveguide. FIGS. 7a and 7b show a change of the insertion loss O and the crosstalk P at wavelengths of 1550 nm and 1310 nm, respectively, according to a length L of a waveguide. In FIGS. 6 and 7, Q represents a design reference value. Here, the "crosstalk" refers to a ratio between a maximum output of a signal measured at an intended port and a maximum output of a signal measured at another certain port. Increase in the crosstalk means that distortion of signals become strong.

in FIGS. 4 and 5 show structures of directional couplers 401 and 501, respectively, wherein the crosstalk and insertion loss are also changed depending on a distance D between waveguides and a length L of a waveguide. FIGS. 8 to 10 graphically represent the changes in crosstalk and insertion loss.

FIGS. 8a and 8b show a change of the insertion loss O and the crosstalk P at wavelengths of 1550 nm and 1310 nm, respectively, according to a distance D between waveguides in the optical communication module employing the demultiplexer of FIG. 4. FIGS. 9a and 9b show a change of the insertion loss O and the crosstalk P at wavelengths of 1550 nm and 1310 nm, respectively, according to a length L of a waveguide. FIGS. 10a, 10b and 10c show a change of the insertion loss O and the crosstalks P1, P2 and P3 at wavelengths of 1550 nm, 1490 nm and 1310 nm, respectively, according to a distance D between waveguides in the optical communication module employing the demultiplexer of FIG. 5. In FIGS. 8a to 10c, Q represents a design reference value.

Thus, in the case of prior art demultiplxers, the satisfaction of a crosstalk standard requires a strict compliance with design optimal values in a width and a length of a waveguide, a distance between waveguides, and so on. A waveguide must be manufactured on the basis of this degree of compliance. However, according to a present process levels, it is difficult to avoid generating a tolerance of about ±0.2 μm. As a result, there is a problem in that a production yield of the demultiplexer is significantly reduced, as many of the manufactured demultiplexers are outside of the required tolerances.

SUMMARY OF THE INVENTION

Accordingly, the present invention has been made at least partially for the purpose of solving some of the above-mentioned problems occurring in the prior art. One aspect of the present invention is to provide an optical demultiplexer having at least one Bragg diffraction grating as well as an optical communication module using the optical demultiplexer, capable of satisfying a crosstalk standard even though a process tolerance become about ±0.2 μm, by allowing an optical demultiplexer using an optical thin film waveguide to have a structure insensitive to design values, such as width and length of a waveguide, and a distance between waveguides.

In order to accomplish the above-mentioned aspect of the invention, there is provided an optical demultiplexer having first and second waveguides arranged adjacently to each other in a predetermined section in order to perform mode coupling. According to the present invention, optical signals that are input through one end of the first waveguide are then transmitted to a light receiving element through the second waveguide, and in which output light waves input through the other end of the first waveguide are output through the one end of the first waveguide, and comprising a first Bragg diffraction grating formed on the second waveguide and having a wavelength selectivity, in order to minimize crosstalk by transmitting a reception wavelength of the optical signals at about 100% and by reflecting a wavelength of the output light waves at about 100%.

Preferably, the optical demultiplexer further comprises a second Bragg diffraction grating formed on the first waveguide in order to transmit the wavelength of the output light waves at about 100% and to reflect the reception wavelength of the optical signals at about 100%.

More preferably, the first and second Bragg diffraction gratings are formed so as to have a slope so that the light waves reflected by the first and second Bragg diffraction gratings exit the through the waveguides.

In order to accomplish this aspect of the invention, there is provided an optical communication module, comprising: a light source; a first optical detector for receiving optical signals having a first wavelength; a first waveguide provided with one end connected with the light source and the other end inputting and outputting the optical signals, and for outputting output light of the light source through the other end; a second waveguide arranged adjacent the first waveguide in a predetermined section in order to perform mode coupling, and having one end connected with the first optical detector, so as to transmit the optical signals of the first wavelength, which are input through the other end of the first waveguide, to the first optical detector; and a first Bragg diffraction grating formed on the one end of the second waveguide and having a wavelength selectivity, in order to minimize crosstalk, which is caused by a wavelength of the output light and measured at the first optical detector, by transmitting the optical signals of the first wavelength at about 100% and by reflecting a wavelength of the output light at about 100%.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Hereinafter, preferred aspects and variations of the present invention will be described in detail with reference to the accompanying drawings. In the following description of the present invention, a detailed description of known functions and configurations incorporated herein will be omitted when it may make the subject matter of the present invention rather unclear. It should also be understood that the drawings are presented for illustration rather than limitation, and a person or ordinary skill in the art appreciates there are variations of the present invention that fall within the spirit of the disclosed invention and the scope of the appended claims.

Figure 1:
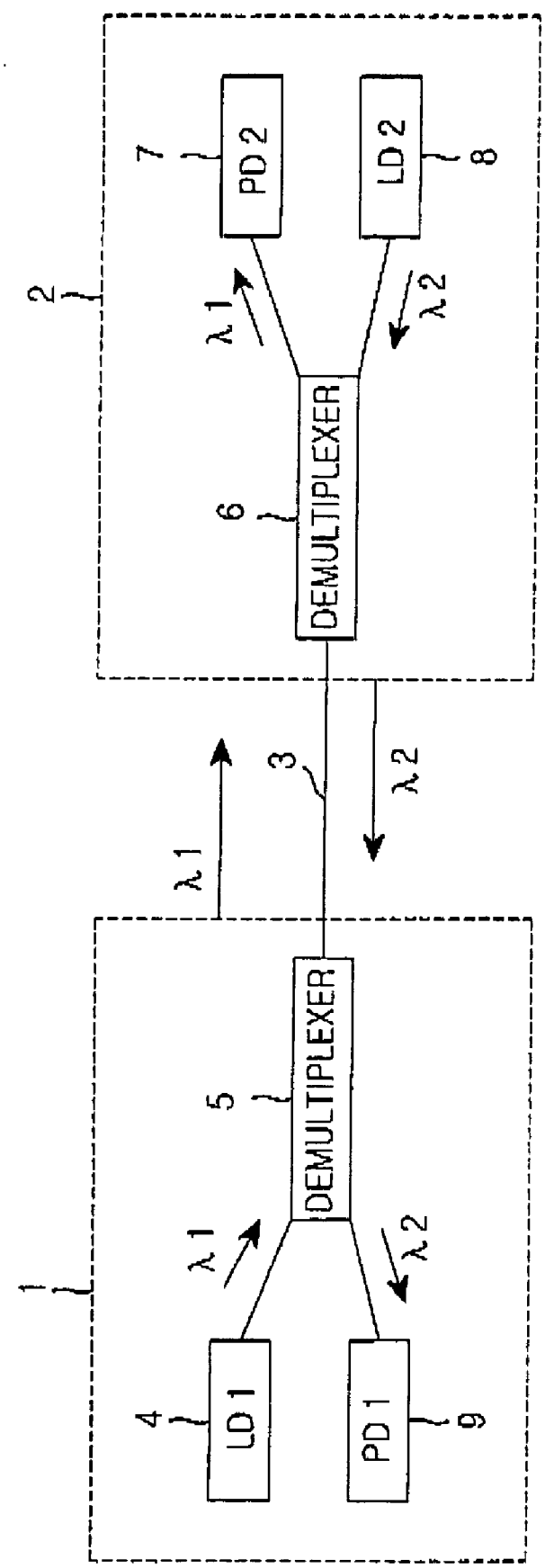
FIG. 1 illustrates the principle of wavelength multiplexing bi-directional optical communication using light of different wavelengths.
Figure 2:
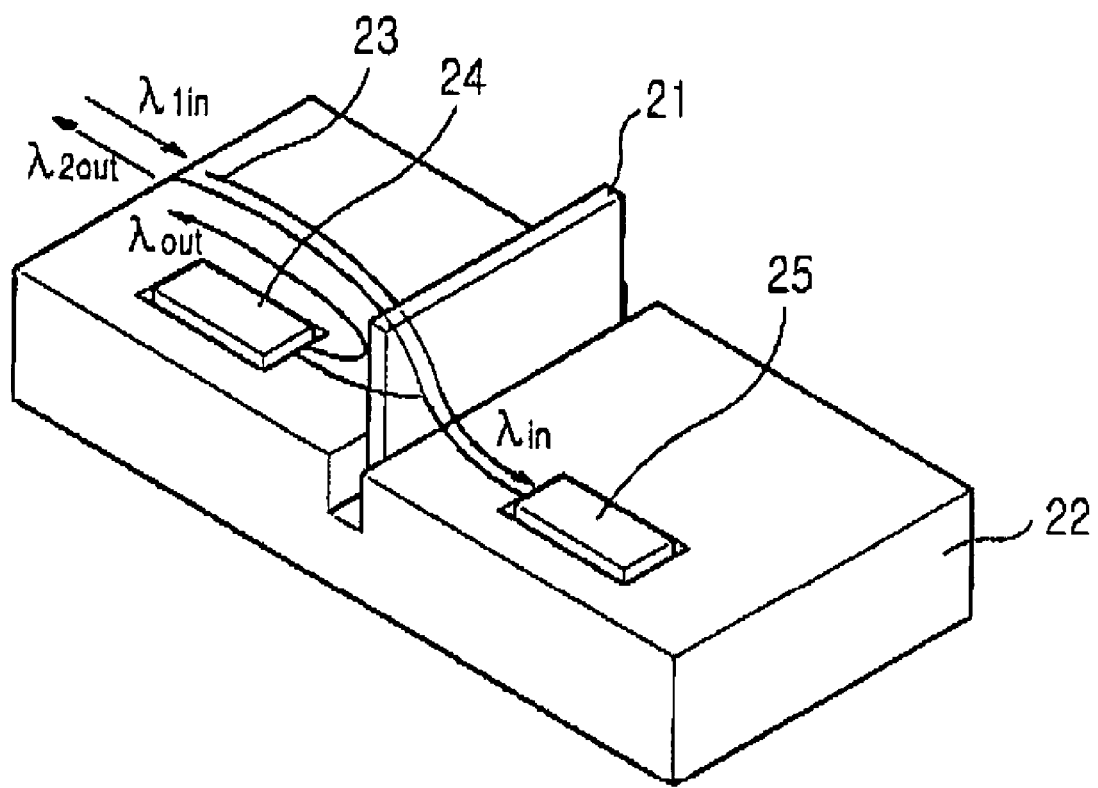
FIG. 2 shows a structure of an optical communication module according to the prior art, in which a demultiplexer using a wavelength division multiplexing filter is applied to the optical communication module.
Figure 3:
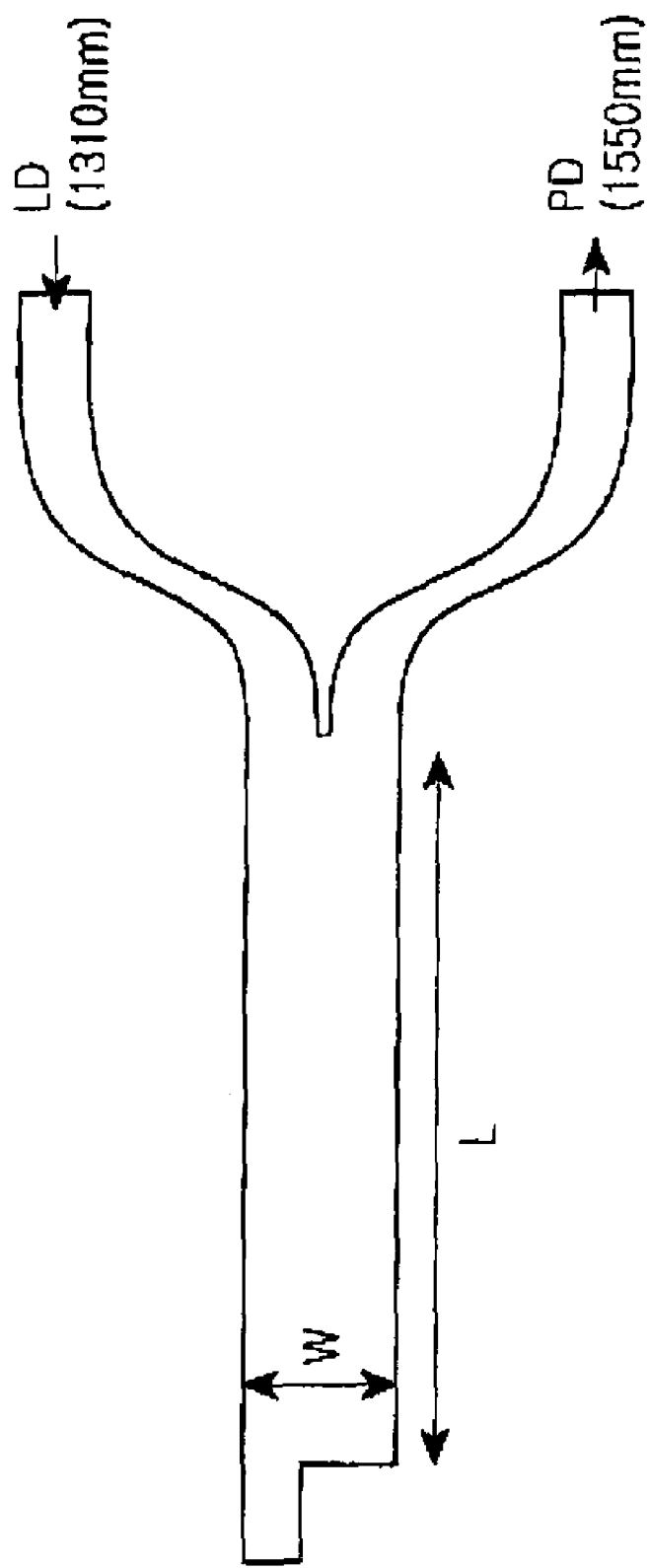
FIG. 3 shows a construction of the conventional demultiplexer using a multi-mode interferometer (MMI)
Figure 4:
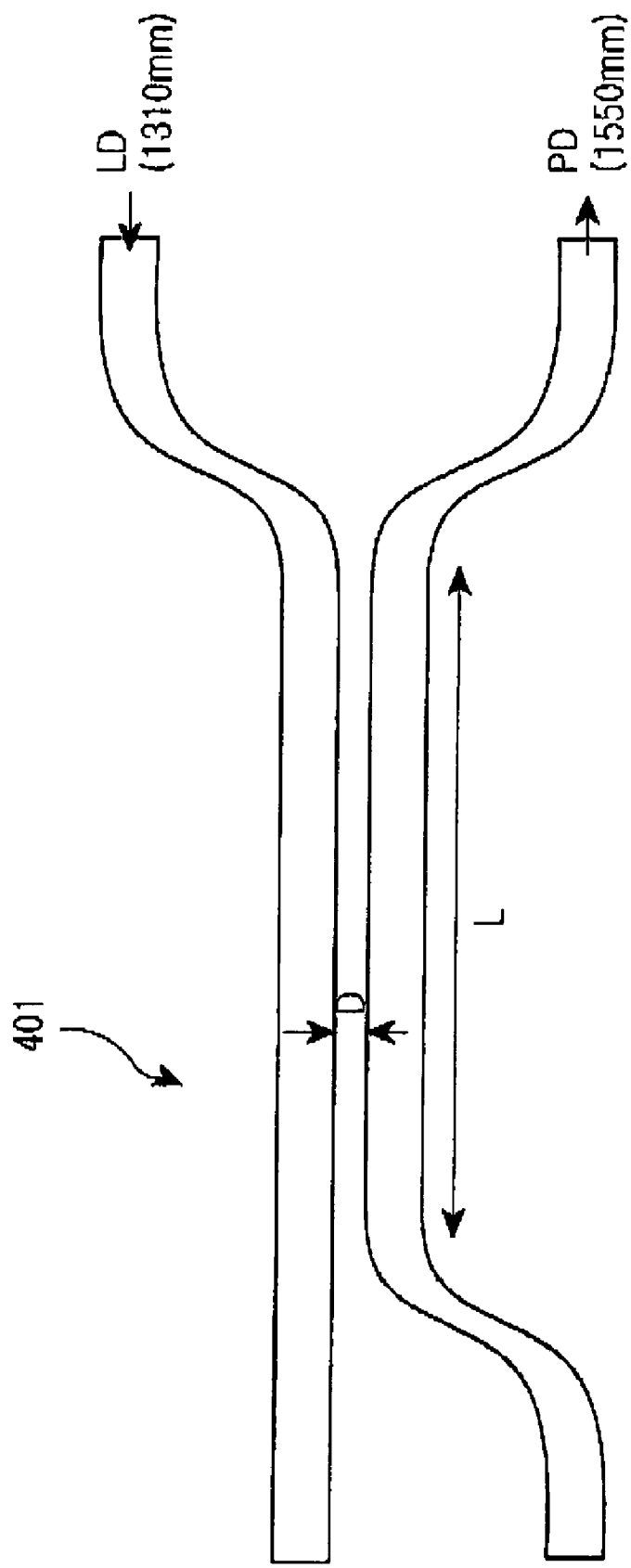
FIG. 4 shows construction of the conventional demultiplexer using a directional coupler (DC) operated with two different wavelengths.
Figure 5:
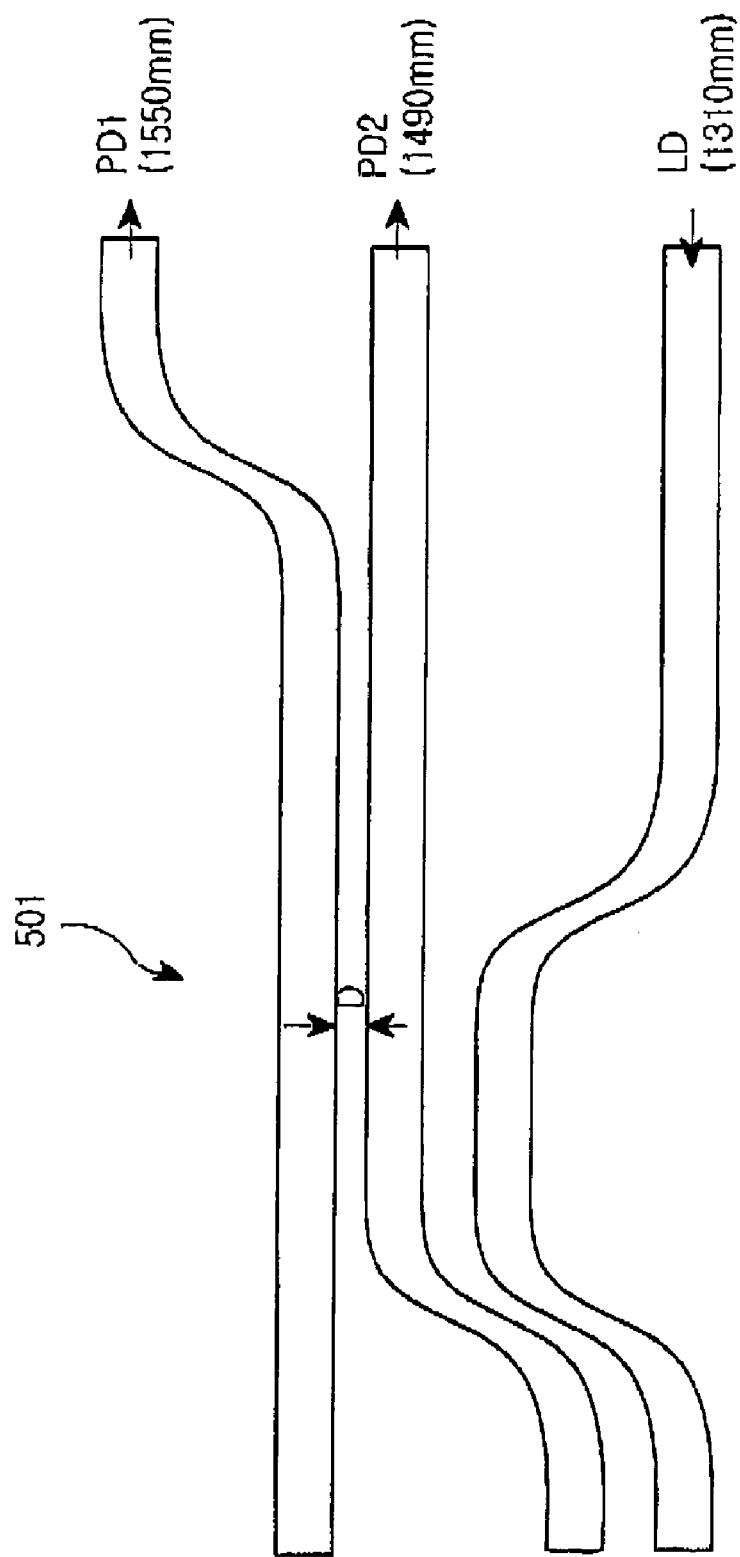
FIG. 5 shows a construction of the conventional demultiplexer using a directional coupler (DC) operated with three different wavelengths.
Figure 6:
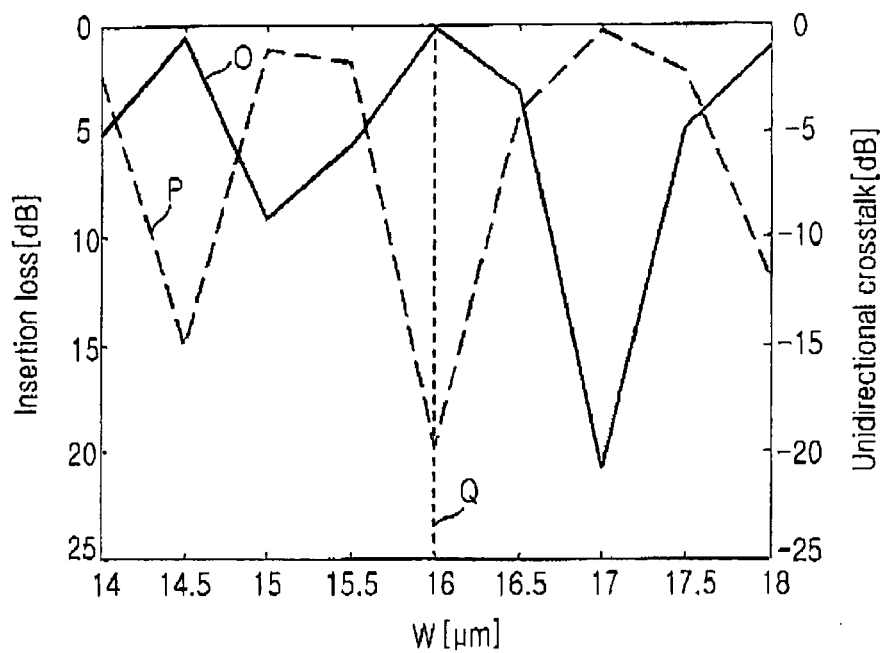
FIGS. 6a and 6b respectively show a change of the insertion loss and the crosstalk at wavelengths of 1550 nm and 1310 nm according to a width W of a waveguide in the optical communication module employing the demultiplexer of FIG. 3.
Figure 6:
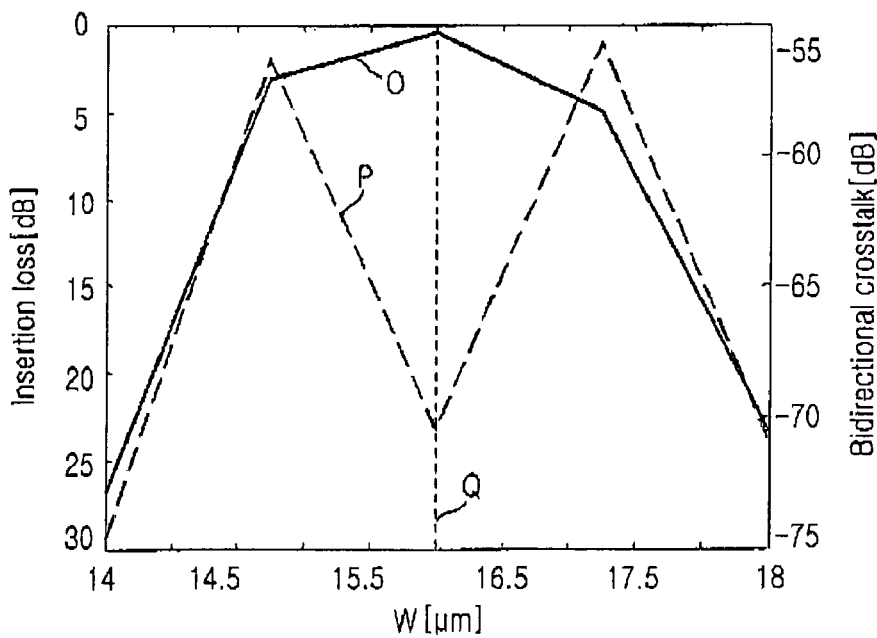
Figure 7:
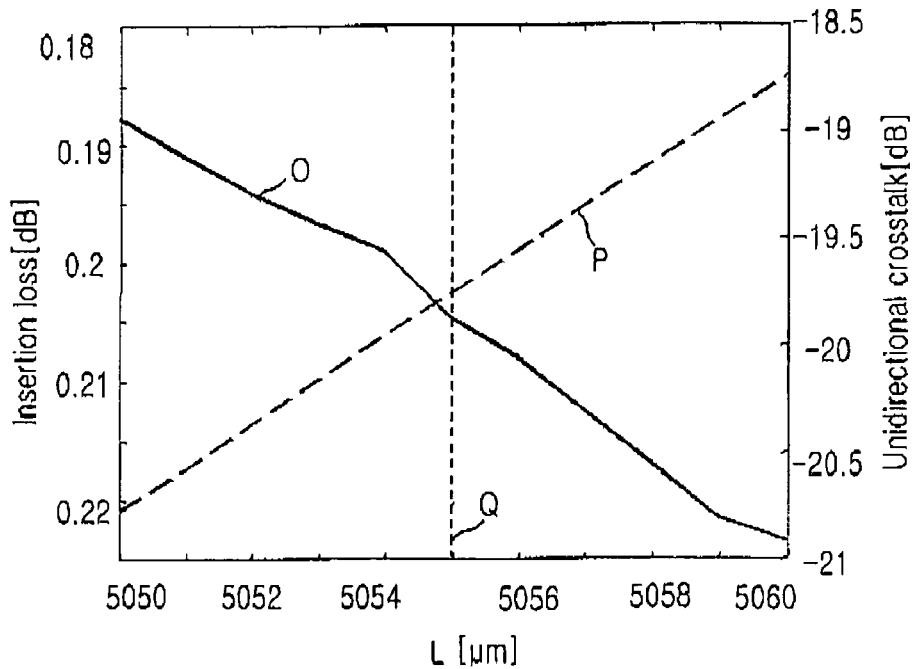
FIGS. 7a and 7b respectively show a change of the insertion loss and the crosstalk at wavelengths of 1550 nm and 1310 nm according to a length L of a waveguide in the optical communication module employing the demultiplexer of FIG. 3.
Figure 7:
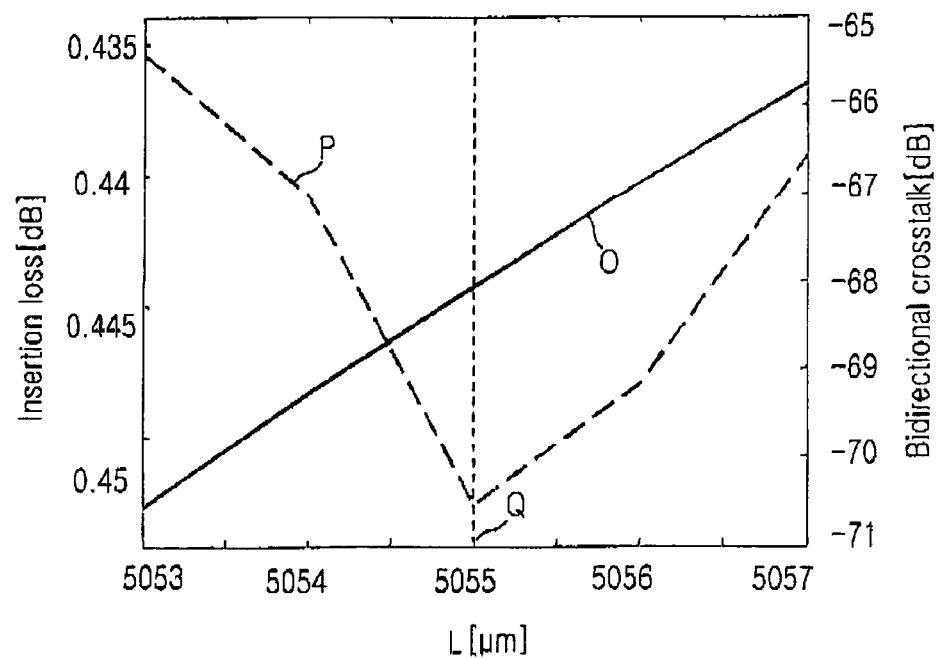
Figure 8:
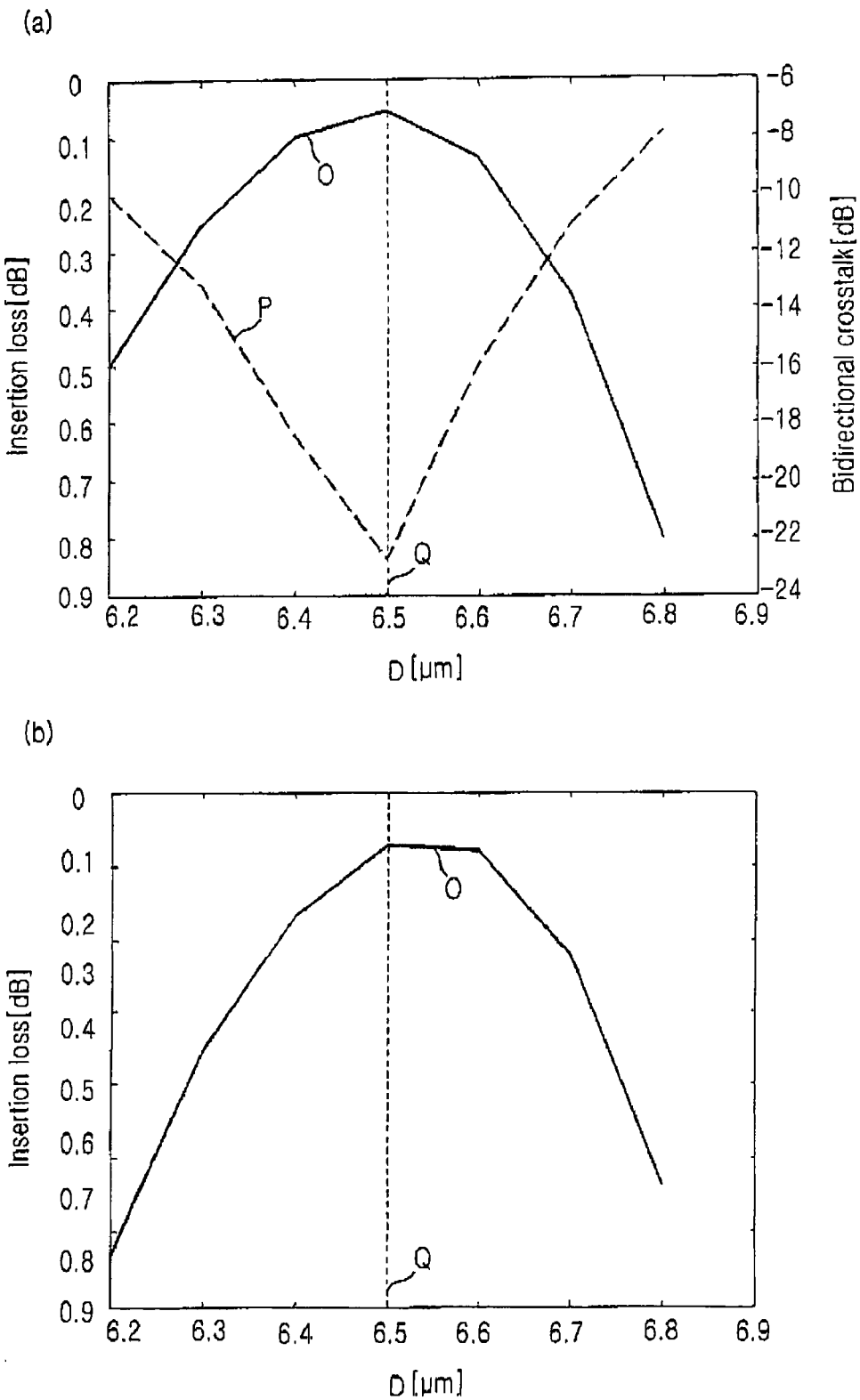
FIGS. 8a and 8b respectively show a change of the insertion loss and the crosstalk at wavelengths of 1550 nm and 1310 nm according to a length of a waveguide in the optical communication module employing the demultiplexer of FIG. 4.
Figure 9:
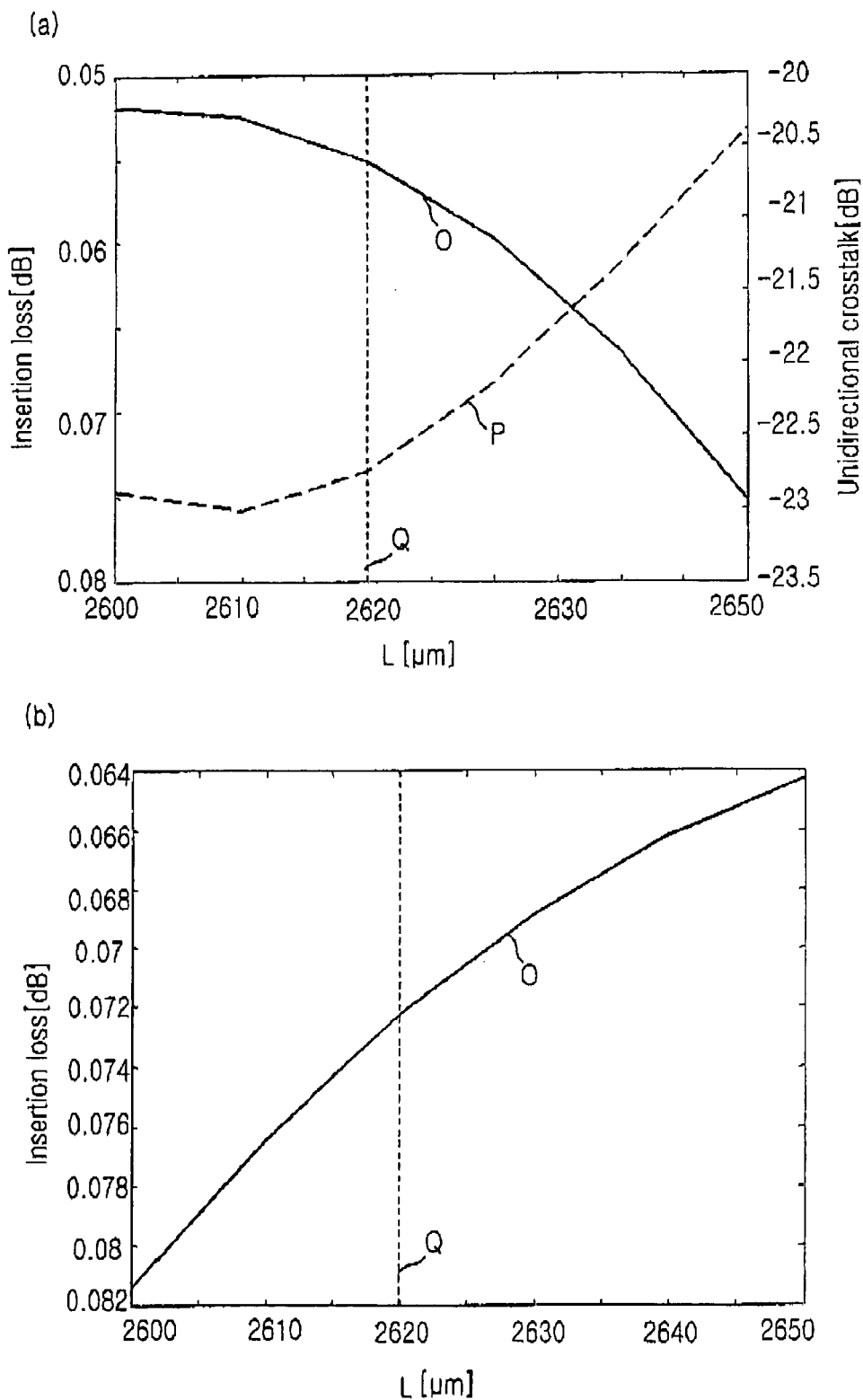
FIGS. 9a and 9b respectively show a change of the insertion loss and the crosstalk at wavelengths of 1550 nm and 1310 nm according to a length of a waveguide in the optical communication module employing the demultiplexer of FIG. 4.
Figure 10:
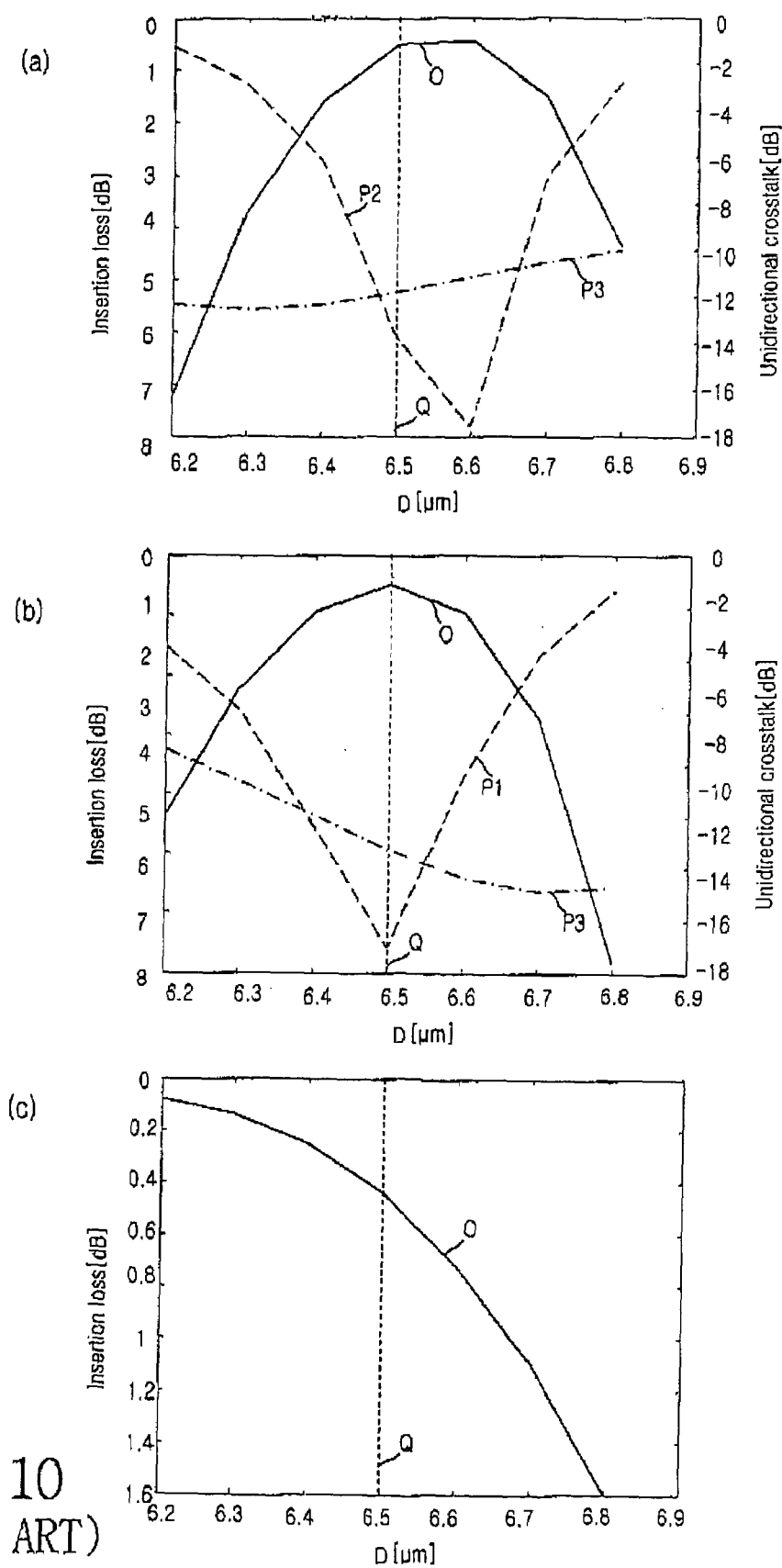
FIGS. 10a, 10b and 10c respectively show a change of the insertion loss O and the crosstalks P1, P2 and P3 at wavelengths of 1550 nm, 1490 nm and 1310 nm according to a distance between waveguides in the optical communication module employing the demultiplexer of FIG. 5.
Figure 11:
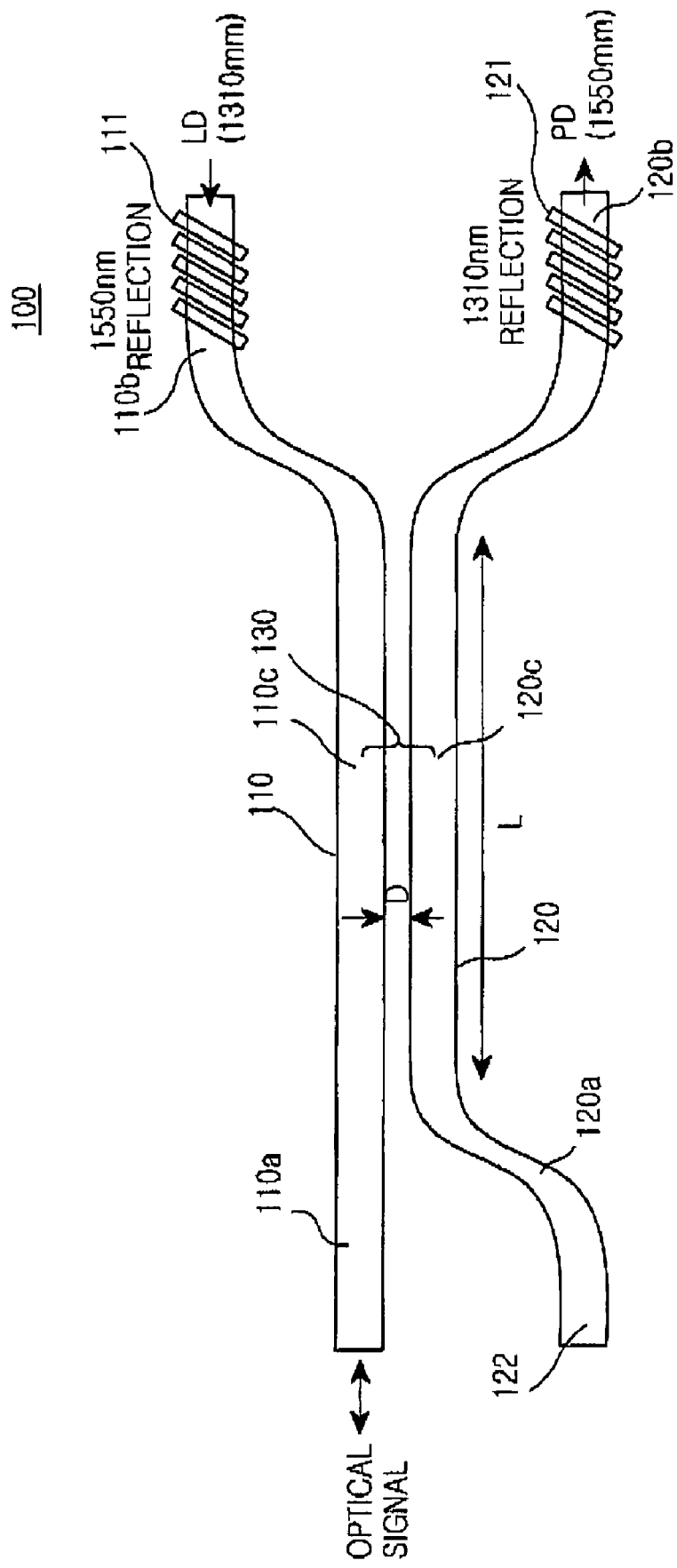
FIG. 11 shows a construction of an optical demultiplexer having Bragg diffraction gratings according to a first preferred aspect of the present invention.

FIG. 11 shows a construction of an optical demultiplexer having Bragg diffraction gratings according to a first preferred aspect of the present invention.

An optical demultiplexer 100 of the present invention includes first and second waveguides 110 and 120 arranged adjacent to each other in each predetermined section in order to perform mode coupling. In order to provide input and output of transmission optical signals, the first waveguide has an input waveguide 110a and a first output waveguide 110b, and the second waveguide has a dummy waveguide 120a and a second output waveguide 120b. Further, the optical demultiplexer 100 includes first and second Bragg diffraction gratings 111 and 121 formed on the first and second output waveguides 110b and 120b, respectively.

The first and second waveguides 110 and 120 are arranged adjacent each other in predetermined sections 110c and 120c, respectively. At the same time, the first and second waveguides extend in a parallel line formation to provide mutual coupling of optical signals between them. Hereinafter, each predetermined section of parallel formation is called a coupling section 130. A coupling coefficient is determined depending on a length L of the coupling section and a distance between the first and second waveguides 110 and 120, in particular between the coupling sections of the first and second waveguides 110 and 120.

The input waveguide 110a extends from the coupling section 110c or 130 to one end of the first waveguide 110, and either receives optical signals from a communication network. Alternately the input waveguide will optical signals to the same communication network or another network for that matter.

The first output waveguide 10b extends from the coupling section 110c or 130 to the other end of the first waveguide 110 and then is connected with a light source, such as a laser diode, in which there is a curved section between the coupling section and the other end.

The first Bragg diffraction grating 111 is then formed on the first output waveguide 110b of the first waveguide 110 connected with the laser diode. This formation allows the output of light of a particular wavelength (e.g., of 1310 nm) emitted from the laser diode to be transmitted at about 100%, but allows input light of a particular wavelength (e.g., of 1550 nm) to be reflected at about 100%. The functions of the Bragg diffraction grating 111 are to use specific characteristics of a Bragg diffraction grating. The characteristics of the Bragg diffraction grating are as follows:

The Bragg diffraction grating is characteristic of functions that it, as a reflection filter, reflects light of a particular wavelength range (i.e., a stop band), but transmits light of the others. This particular Bragg diffraction grating is designed to periodically vary a refractive index inside an optical fiber waveguide. To do this, there is used various methods, such as a hologram one using an ultraviolet laser, a mask method and so forth. All these methods have one thing in common—in that they change the refractive index of the optical waveguide—using a photosensitivity of the optical waveguide.

The photosensitivity refers to a phenomenon that when the optical waveguide is applied by strong ultraviolet rays having a wavelength of about 240 nm, a refractive index is increased at a portion where the ultraviolet rays are applied to the optical waveguide. This photosensitivity has influence on a reflectivity of the Bragg diffraction grating. The photosensitivity is proportional to a reflectivity. For example, when the photosensitivity is high, the reflectivity is also high. A principle that light of a particular wavelength is reflected at the Bragg diffraction grating is as follows: While transmitting the Bragg diffraction grating, light waves are reflected between parallel lines.

In this case, when the reflected light waves have a phase of $2n\pi$ with accuracy, the light waves are subjected to a constructive interference. On the basis of this principle, each line may be engraved on the optical fiber by means of various methods, for example, one of engraving on a waveguide in a vertical direction, one of engraving on a waveguide at a constant slop. In the present aspect of the invention, the Bragg diffraction grating is formed to have a slope relative to the waveguide, so as not to prevent light reflected from the Bragg diffraction grating from returning in an incident direction. In other words the grating does not prevent light reflected from the grating from being reflected to the exit outside.

The dummy waveguide 120a extends from the coupling section 120c or 130 to one end of the second waveguide 120, in which there is a first curved section between the coupling section and the one end. Preferably, one end 122 of the second waveguide 120 is terminated.

The second output waveguide 120b extends from the coupling section 120c or 130 to the other end of the second waveguide 120 and then is connected with an optical detector PD, in which there is a second curved section between the coupling section and the other end.

The second Bragg diffraction grating 121 is formed on the second output waveguide 120b of the second waveguide 120 connected with the optical detector PD, and allows input light of a particular wavelength (e.g., of 1550 mm) emitted from the optical detector PD to be transmitted at about 100%, but allows output light of a particular wavelength (e.g., of 1310 nm) to be reflected at about 100%. Characteristics and a manufacturing method of the Bragg diffraction grating 121 are similar to the foregoing.

The demultiplexer that has the aforementioned construction in accordance with the present invention operates as follows:

The input light waves of a wavelength band of 1.5 μm, which are inputted through the input waveguide 110a, travel through the coupling section 130 to the second waveguide 120 connected with the optical detector PD, in which all of the input light waves or optical signals do not travel to the optical detector PD, but some travel through the first optical waveguide 110 to the light source LD. Here, the first Bragg diffraction grating 111, which is formed on the first output waveguide 110b connected with the light source LD, has a characteristic of reflecting light waves of the wavelength band of 1.5 µm at about 100% and of transmitting light waves of the wavelength band of 1.3 µm at about 100%, so that crosstalk, which is caused by the input light waves of the wavelength band of 1.51 µm and measured at the light source LD, becomes very low. In addition, the first Bragg diffraction grating 111 has a slope of a certain angle other than 90 degrees, so that the reflected light waves exit the waveguide, not in an incident direction. Meanwhile, the light waves of the wavelength band of 1.3 µm emitted from the light source LD sequentially pass through the first output waveguide 110b connected with the light source LD, the coupling section 130 and the input waveguide 110a to be directed to a base station. In this case, some of the light waves are inputted through the second optical waveguide 120 into the optical detector PD. At this time, the second Bragg diffraction grating 121, which is formed on the second output waveguide 120b connected with the optical detector PD, has a characteristic of reflecting light waves of the wavelength band of 1.3 µm at about 100% and of transmitting light waves of the wavelength band of 1.5 µm at about 100%, so that crosstalk, which is caused by the output light waves of the wavelength band of 1.3 µm and measured at the optical detector PD, becomes very low.

Figure 12:
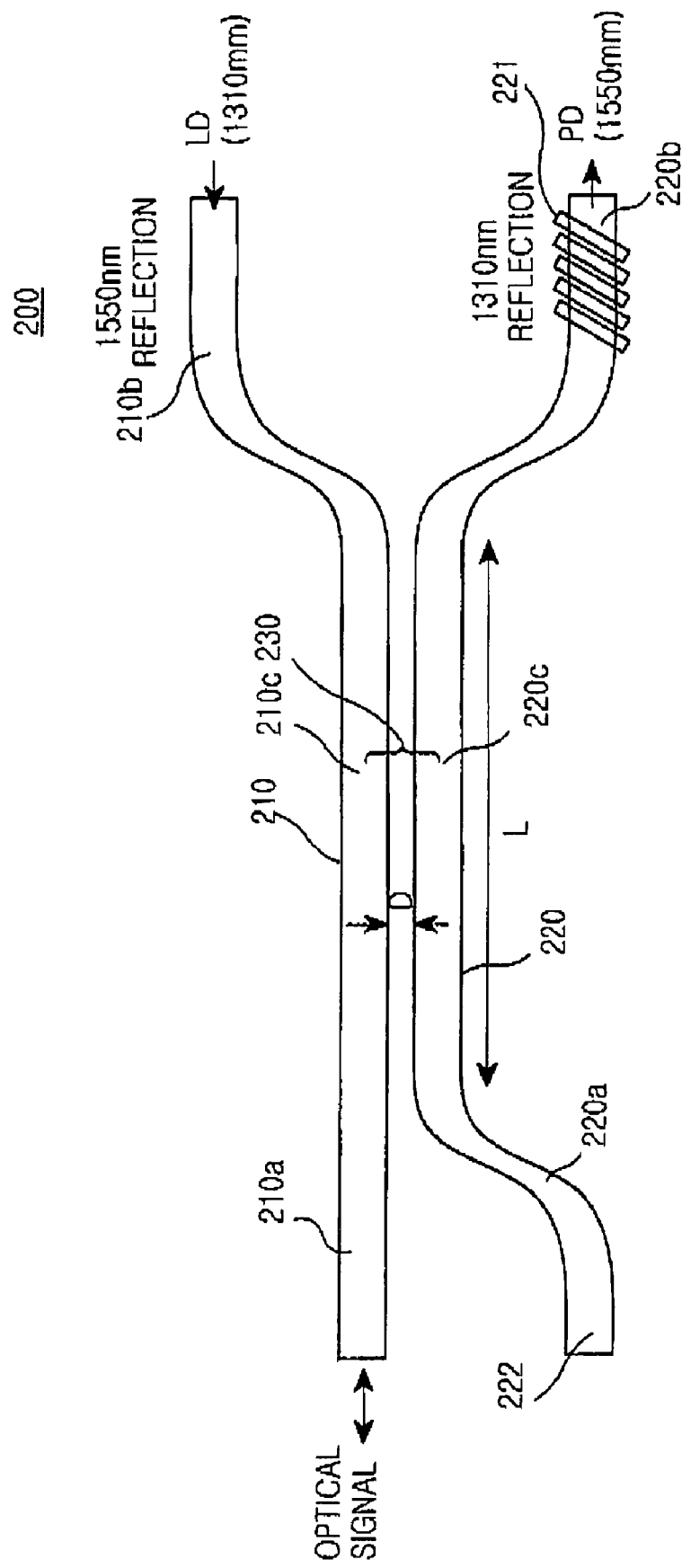
FIG. 12 shows a construction of an optical demultiplexer having a Bragg diffraction grating according to a second preferred aspect of the present invention.

FIG. 12 shows a construction of an optical demultiplexer having a Bragg diffraction grating according to a second preferred embodiment of the present invention.

An optical demultiplexer 200 of the present embodiment includes first and second optical waveguides 210 and 220 arranged adjacently to each other in each predetermined section in order to perform mode coupling. In order to provide input and output of transmission optical signals, the first optical waveguide 210 has an input waveguide 210a and a first output waveguide 210b, and the second optical waveguide 220 has a dummy waveguide 220a and a second output waveguide 220b. Further, the optical demultiplexer 200 includes a Bragg diffraction grating 221 formed on the second output waveguide 220b. The second aspect of the invention provides operation and construction similar to the first aspect of the invention, except that the Bragg diffraction grating is removed from the first optical waveguide connected with the light source LD in the first aspect. Therefore, repeated members, operation, function, etc. will be no longer described in detail. Here, optical signals of the wavelength band of 1.3 µm, as bi-directional crosstalk (BXT), which are incidented toward the photo diode PD, operate as if a reception value is present in spite of non-presence of reception signals, because the photo diode PD carries out a direct reaction to give an output value. Therefore, the optical signals give rise to a direct problem on operation of related elements. By contrast, signals of the wavelength band of 1.5 µm, as unidirectional crosstalk (UXT), which are incidented toward the light source LD, may influence oscillation of the laser to a certain degree, but not to a great degree. For this reason, the Bragg diffraction grating can be removed on the side of the light source LD.

Figure 13:
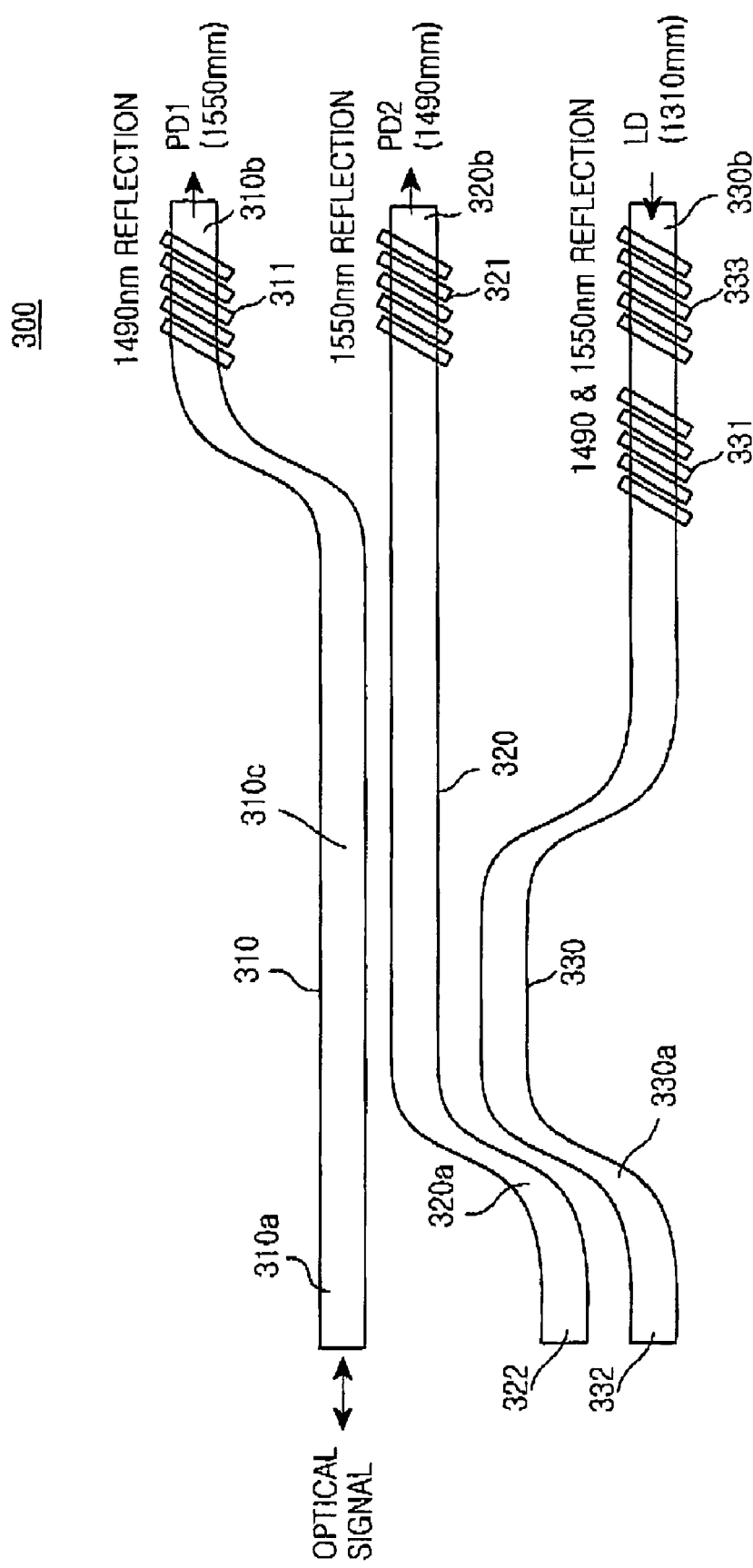
FIG. 13 shows a construction of an optical demultiplexer having Bragg diffraction gratings according to a third preferred aspect of the present invention.

FIG. 13 shows a construction of an optical demultiplexer having Bragg diffraction gratings according to a third preferred aspect of the present invention. The third aspect relates to a construction of a triplexer, for separating two kinds of input light waves having wavelengths of 1550 nm and 1490 nm and one kind of output light waves having wavelength of 1310 nm, and dividing their paths.

An optical demultiplexer or triplexer 300 of the third aspect of the invention includes first, second and third optical waveguides 310, 320 and 330 arranged adjacently to each other in each predetermined section in order to perform mode coupling. In order to provide input and output of transmission optical signals, the first optical waveguide 310 has an input waveguide 310a and a first output waveguide 310b, the second optical waveguide 320 has a dummy waveguide 320a and a second output waveguide 320b, and the third optical waveguide 330 has a dummy waveguide 330a and a third output waveguide 330b.

Furthermore, the triplexer 300 includes first to fourth Bragg diffraction gratings 311, 321, 331 and 333 formed on the first to third output waveguides 310b, 320b and 330b. In FIG. 13, reference numerals 322 and 332 not described are each indicated by ends of the dummy waveguides 320a and 330a.

The construction of the triplexer of the third aspect of the invention includes that the first Bragg diffraction grating 311, which reflects light waves of a wavelength band of 1490 nm (and transmits light waves of a wavelength band of 1550 nm at about 100%), is arranged on the first output waveguide 310b of the first optical waveguide 310 connected with a first optical detector PD1 which receives light waves of a wavelength band of 1550 nm, in that the second Bragg diffraction grating 321, which reflects light waves of a wavelength band of 1550 nm (and transmits light waves of a wavelength band of 1490 nm at about 100%), is arranged on the second output waveguide 320b of the second optical waveguide 320 connected with a second optical detector PD2 which receives light waves of a wavelength band of 1490 nm, and in that the third and fourth Bragg diffraction gratings 331 and 333, which reflect light waves of wavelength bands of 1550 nm and 1490 mm, are arranged on the third output waveguide 330b of the third optical waveguide 330 connected with a light source LD which transports light waves of a wavelength band of 1310 nm.

Alternatively, instead of the third and fourth Bragg diffraction gratings 331 and 333, which are formed on the third output waveguide 330b of the third optical waveguide 330 connected with the light source LD and reflect light waves of wavelength bands of 1550 nm and 1490 nm, other Bragg diffraction gratings having a wide bandwidth for reflecting entire light waves ranging from 1490 nm to 1550 nm may be used.

The triplexer 300 of the third aspect having the aforementioned construction operates as follows:

Among input light waves ranging from 1490 nm to 1550 nm which are inputted from a base station through the input waveguide 310a, some entering toward the light source LD are reflected outside the third optical waveguide 330 by the third and fourth Bragg diffraction gratings 331 and 333, which reflect light waves of wavelength bands of 1490 nm and 1550 nm at about 100%, and are formed on the third optical waveguide 330 connected with the light source LD.

Therefore, unidirectional crosstalk, which is caused by the input light waves and measured at the light source LD, becomes very low. Some of the light waves of the wavelength band of 1310 nm, which are emitted from the light source LD, enter the optical detectors PD1 and PD2 through the optical waveguides 310 and 320. The Bragg diffraction gratings 311 and 321, which are formed on the output waveguides 310b and 320b of the optical waveguides 310 and 320 connected with the optical detectors, are characteristic of transmitting light waves of the wavelength bands of 1490 nm and 1550 nm at about 100% and of reflecting light waves of the wavelength band of 1310 nm at about 100%, so that bi-directional crosstalk, which is caused by the output light waves and measured at the respective optical detectors PD1 and PD2, becomes very low.

Figure 14:
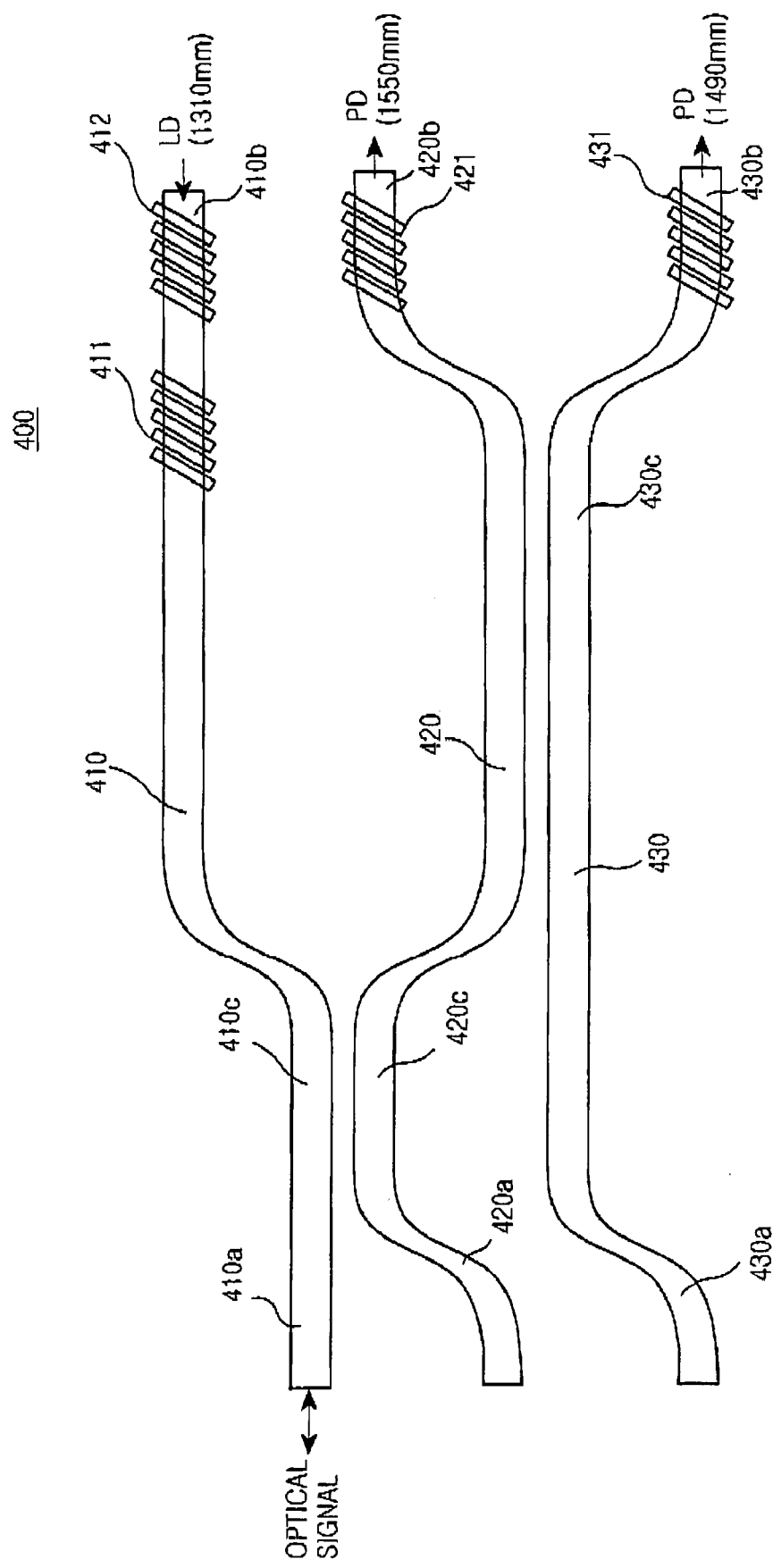
FIG. 14 shows a construction of an optical demultiplexer having Bragg diffraction gratings according to a fourth preferred aspect of the present invention.

FIG. 14 shows a construction of an optical demultiplexer having Bragg diffraction gratings according to a fourth preferred aspect of the present invention. The fourth aspect of the invention relates to a construction of another triplexer.

An optical demultiplexer or triplexer 400 of the fourth aspect includes first, second and third optical waveguides 410, 420 and 430 arranged adjacently to each other in each predetermined section in order to perform mode coupling. In order to provide input and output of transmission optical signals, the first optical waveguide 410 has an input waveguide 410a and a first output waveguide 410b, the second optical waveguide 420 has a dummy waveguide 420a and a second output waveguide 420b, and the third optical waveguide 430 has a dummy waveguide 430a and a third output waveguide 430b. Further, the triplexer 400 includes first to fourth Bragg diffraction gratings 411, 421, 431 and 433 formed on the first to third output waveguides 410b, 420b and 430b.

Similar to the third aspect of the invention shown in FIG. 13, the triplexer 400 of the fourth aspect has the foregoing construction functions to separate two kinds of input light waves, which have wavelengths of 1550 nm and 1490 nm and are inputted from a base station, and one kind of output light waves having wavelength of 1310 nm, and to divide their paths. Since the triplexer 400 of the fourth aspect similarly to that of the third aspect of the invention, its detailed description will be omitted.

Meanwhile, the detailed description of the present invention has been made regarding particular aspects of the invention, and thus it will be obvious to those skilled in the art that various changes in form and details may be readily made therein without departing from the spirit and scope of the invention as defined by the appended claims.

For example, in addition to the dielectric filter mentioned in the foregoing embodiments, a multi-mode interferometer (MMI), a directional coupler or the like can be additionally used. Thus, the scope of the present invention is not limited to the foregoing embodiments, but should be defined by the appended claims as well as their equivalents.

As mentioned above, the demultiplexer according to the present invention is provided with at least one Bragg diffraction grating, which is arranged on the optical waveguides which are connected with the light source and the light receiving elements and has wavelength selectivity of transmitting desired light waves at about 100% and of reflecting undesired light waves at about 100%. Thus, while the demultiplexer using the optical thin film waveguide is manufactured, the distance between waveguides, the width and length of the element have a tolerance of about ±0.2 μm, it is possible to minimize the crosstalk measured at the optical detector PD as well as enhance a process margin, so that a production yield can be highly improved.

What is claimed is:

1. An optical communication module, comprising:
   a light source;
   a first optical detector for receiving a plurality of optical signals having a first wavelength;
   a first waveguide provided with a first end connected with the light source and a second end for inputting and outputting the plurality of optical signals, and for outputting output light of the light source through the second end;
   a second waveguide adjacent to the first waveguide at a predetermined section for mode coupling, said second waveguide having a third end connected with the first optical detector and transmitting the plurality of optical signals of the first wavelength inputted from the second end of the first waveguide to the first optical detector;
   a first Bragg diffraction grating formed on the third end of the second waveguide and having a wavelength selectivity for minimizing crosstalk from a wavelength of the output light that was measured at the first optical detector by transmitting the plurality of optical signals of the first wavelength at about 100% and by reflecting a wavelength of the output light at about 100%; and
   a dummy waveguide extending from a fourth end of the second waveguide, the third and fourth ends of the second waveguide being disposed at opposite ends of the second waveguide.

2. An optical communication module according to claim 1, further comprising a second Bragg diffraction grating formed on the first end of the first waveguide for minimizing crosstalk from a reception wavelength of the optical signals and measured at the light source, by transmitting the wavelength of the output light waves at about 100% and by reflecting the reception wavelength of the optical signals at about 100%.

3. An optical communication module according to claim 2, wherein the Bragg diffraction grating is formed to have a slope so that light waves reflected by the Bragg diffraction grating exit the waveguide.

4. An optical communication module according to claim 1, further comprising:
   a second optical detector for receiving optical signals having a second wavelength;
   a third waveguide arranged adjacent the second waveguide in a predetermined section of each of the first, second and third waveguides in order to perform mode coupling, and having a fourth end connected with the second optical detector, so as to transmit the optical signals of the second wavelength, which are input through the second end of the first waveguide, to the second optical detector; and
   a third Bragg diffraction grating formed on the fourth end of the third waveguide in order to minimize crosstalk, which is caused by a wavelength of the output light waves and measured at the second optical detector, by transmitting the reception wavelength of the optical signals at about 100% and by reflecting the wavelength of the output light waves at about 100%.

5. An optical communication module according to claim 4, further comprising a fourth Bragg diffraction grating formed on the first end of the first waveguide for minimizing crosstalk caused by the optical signals of the first and second wavelengths and measured at the light source by transmitting the wavelength of the output light waves at about 100% and by reflecting the optical signals of the first and second wavelengths at about 100%.

6. An optical communication module according to claim 5, wherein the fourth Bragg diffraction grating includes:
   a fifth Bragg diffraction grating for transmitting the wavelength of the output light waves at about 100% and by reflecting the optical signals of the first wavelength at about 100%; and
   a sixth Bragg diffraction grating for transmitting the wavelength of the output light waves at about 100% and by reflecting the optical signals of the second wavelength at about 100%.

7. An optical communication module according to claim 6, wherein the Bragg diffraction grating is formed to have a slope so that light waves reflected by the Bragg diffraction grating exit the waveguide.

8. An optical communication module according to claim 4, wherein the Bragg diffraction grating is formed to have a slope so that light waves reflected by the Bragg diffraction grating exit the waveguide.

9. An optical communication module according to claim 5, wherein the Bragg diffraction grating is formed to have a slope so that light waves reflected by the Bragg diffraction grating exit the waveguide.

10. An optical communication module according to claim 5, wherein the Bragg diffraction grating is formed to have a slope so that light waves reflected by the Bragg diffraction grating exit the waveguide.

11. An optical communication module according to claim 5, wherein the Bragg diffraction grating is formed to have a slope so that light waves reflected by the Bragg diffraction grating exit the waveguide.

12. An optical communication module according to claim 1, wherein the Bragg diffraction grating is formed to have a slope so that light waves reflected by the Bragg diffraction grating exit the waveguide.

* * * * *